US006539271B2

(12) United States Patent
Lech et al.

(10) Patent No.: US 6,539,271 B2
(45) Date of Patent: Mar. 25, 2003

(54) QUALITY MANAGEMENT SYSTEM WITH HUMAN-MACHINE INTERFACE FOR INDUSTRIAL AUTOMATION

(75) Inventors: Mark Matthew Lech, Middlefield, CT (US); Theodore Drummond Hill, III, Suffolk, VA (US); Alan Luis Arvidson, Burlington, CT (US); Scott Raymond Paddock, Waterford, NY (US); Ahmir Hussain, Loundonville, NY (US)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 09/749,336

(22) Filed: Dec. 27, 2000

(65) Prior Publication Data

US 2002/0082736 A1 Jun. 27, 2002

(51) Int. Cl.$^7$ ................................. G05B 11/01
(52) U.S. Cl. ................... 700/108; 700/109; 700/110; 701/29; 701/35; 709/100
(58) Field of Search ................. 700/108, 109, 700/110, 9, 10, 19, 32, 78, 79, 90, 275; 701/29, 35; 702/182–185, 188; 709/100; 340/3.1

(56) References Cited

U.S. PATENT DOCUMENTS 5,799,286 A * 8/1998 Morgan et al. ............... 705/30
5,842,202 A * 11/1998 Kon ............................ 707/2
6,115,643 A * 9/2000 Stine et al. ................ 700/108
6,138,249 A * 10/2000 Nolet ......................... 714/25
6,202,037 B1 * 3/2001 Hattori et al. ............. 700/109
6,336,078 B1 * 1/2002 Sakayori et al. ............ 702/81

* cited by examiner

Primary Examiner—Leo Picard
Assistant Examiner—Michael D Masinick
(74) Attorney, Agent, or Firm—Cantor Colburn LLP

(57) ABSTRACT

A quality management system and computer based process for managing quality are disclosed. The quality management system includes a set of networked operator stations for entering data including critical to quality customer information and information relating to the equipment to be monitored on a quality basis. The system further includes an application server on the network for running the programs of the system such as critical to quality setup, report generation, logging to the database, and maintenance events. A database server is further included on the network for storing the local database. A web server holding a capability warehouse connects to the local database over a web connection. The process for managing the quality of the monitored electrical equipment includes sending process capability data from the local database to the capability warehouse, updating an entitlement database embedded in the capability warehouse, delivering new schema information to the local database from the entitlement database, and reporting information to the customer at an operator station via an automatic or requested report.

20 Claims, 10 Drawing Sheets

FIG. 8

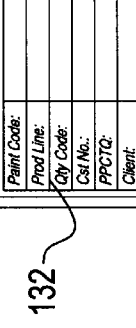
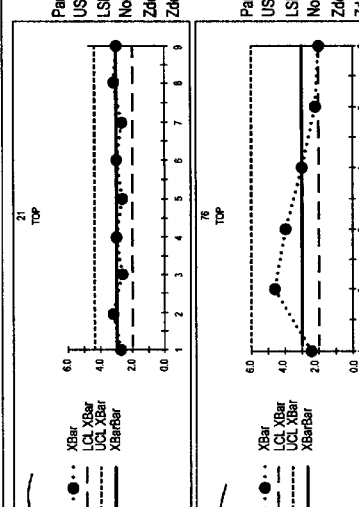
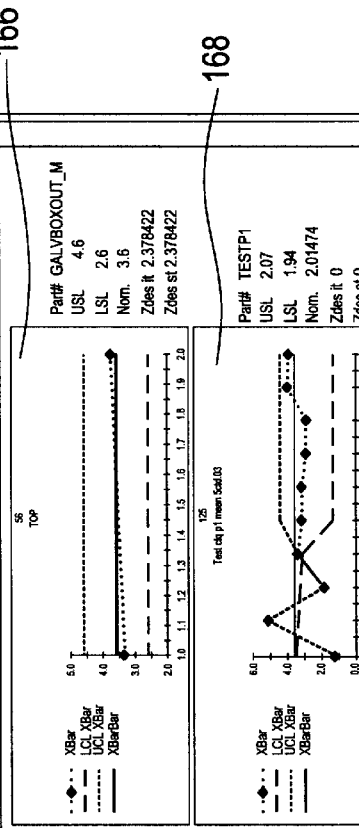
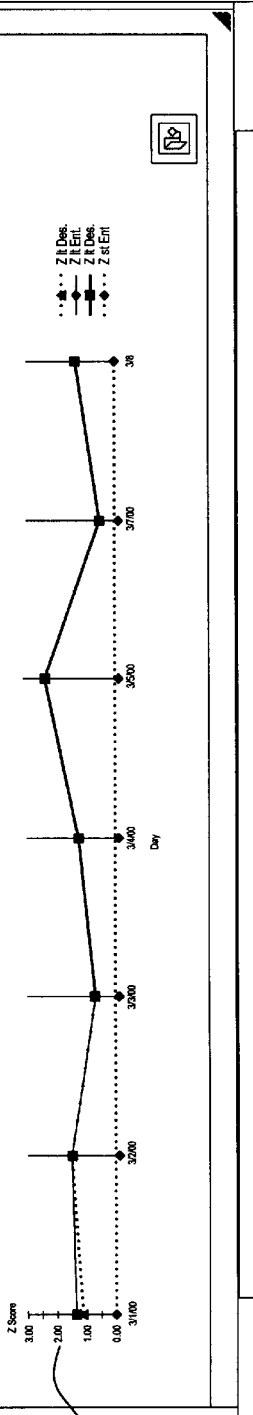
FIG. 9

QUALITY MANAGEMENT SYSTEM WITH HUMAN-MACHINE INTERFACE FOR INDUSTRIAL AUTOMATION

BACKGROUND OF THE INVENTION

The present invention relates to a quality management system, and more particularly relates to a quality management system designed for use with a human-machine interface software application for industrial automation.

Automation software can be used to help businesses such as process and manufacturing industries improve their productivity and profitability by combining factory automation equipment and control devices with software products that are focused on customer objectives. If exploited to its full advantages, industrial automation software can help reduce development costs, lower project life-cycle costs, and provide faster and easier application development. In addition, some software programs, such as CIMPLICITY® automation software, available from GE Fanuc, provides real-time information about the plants and processes to assist in making more productive decisions.

Automation software can affect many aspects of an operation. Such software can integrate operational and IT systems, allowing better management of the infrastructure and improving the return on investment from ERP systems. Production management capabilities can include assistance in managing work-in-process inventory, finding critical jobs on the production floor, meeting production schedules, improving the utilization of manufacturing resources and collecting and managing production critical data. Such software may further assist in monitoring power quality and consumption for preventing peak demand surcharges. Plant floor employees can be provided with information to make better decisions in real-time when they are most effective. Operators can be provided with important process data needed to improve yield and reduce scrap.

Finally, automation software can be used to monitor the quality of the connected control systems by collecting monitoring associated data. Data analysis may include analyzing data collected by the software system and comparing current trends with past trends to identify and correct process problems. Other useful functions for managing quality include data logging, historical data viewing, and data modification and recalculation. To take advantage and make sense of these functions, some software systems offer reporting packages that help the customer to generate basic process-related reports. Reports may be retrieved on-demand, or may be produced on a timed or event basis.

The prior art quality management systems, as they relate to automation software, have lacked some degree of sophistication in that the collected data has been limited to the outputs and status of the connected control devices. That is, the data logging capabilities of the prior art have been primarily limited to receiving raw and calculated data directly from the control devices. Thus, the retrieved information has had to be manipulated to provide useful readings to the user, and, in effect, has provided a retroactive method of quality management.

BRIEF SUMMARY OF THE INVENTION

In an exemplary embodiment of the invention, a quality management system preferably comprises a first operator station adapted to receive manual entry operations, a second operator station adapted to receive data from gages, test equipment, control devices, and power monitoring devices, and at least a subset of these elements electrically connected to the second operator station. The management system further preferably includes an application server storing a first program for setting up customer quality information, a second program for generating reports, a third program for logging to a database, and a fourth program for maintaining events. A database server stores a local database and a web server stores a capability warehouse in the quality management system. The first operator station, second operator station, application server, and database server are connected over a shared network, while the web server is connected to the database server over a web connection.

A computer based process for managing quality of the connected electrical equipment preferably comprises providing the network to support the operator stations and servers, manually inputting a selection of critical to quality factors into the first operator station, sending, over the network, the selection of critical to quality factors to the application server, configuring the critical to quality factors in the application server, storing configured critical to quality factors in the local database stored in the database server, connecting the electrical equipment to be monitored on a quality basis to a the second operator station, collecting data from the electrical equipment into the second operator station, storing the data from the electrical equipment in the local database, combining the data from the electrical equipment with the configured critical to quality factors to form process capability data, sending the process capability data from the database server to the capability warehouse in the web server, updating an entitlement database embedded in the capability warehouse, sending new schema information from the entitlement database to the local database; and, reporting information from the local database to the first operator station.

The above-discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several Figures:

FIG. 8 shows a sample Z score summary report generated by the QMS of the present invention;

FIG. 9 shows a sample product score card report generated by the QMS of the present invention; and, FIG. 10 shows a sample web report generated by the QMS of the present invention.

DETAILED DESCRIPTION OF THE INVENTION

The Quality Management System ("QMS") of the present invention provides a proactive method of quality management by first inputting a customer's critical-to-quality ("CTQ") definitions, process parameters, and manufacturing capability. The CTQ factors, or CTQs, are key customer and product factors which are identified in the early stages of integrating the QMS, but may change as needed by the customer. CTQs may include, but are not limited to, information relating to ensuring that the industry's customers are getting what they want, when they want it, on time, undamaged, and working. This precursor of setup and data collection to the QMS enables the system of the present invention to provide continuous improvement to all areas of the industry.

Figure 1:
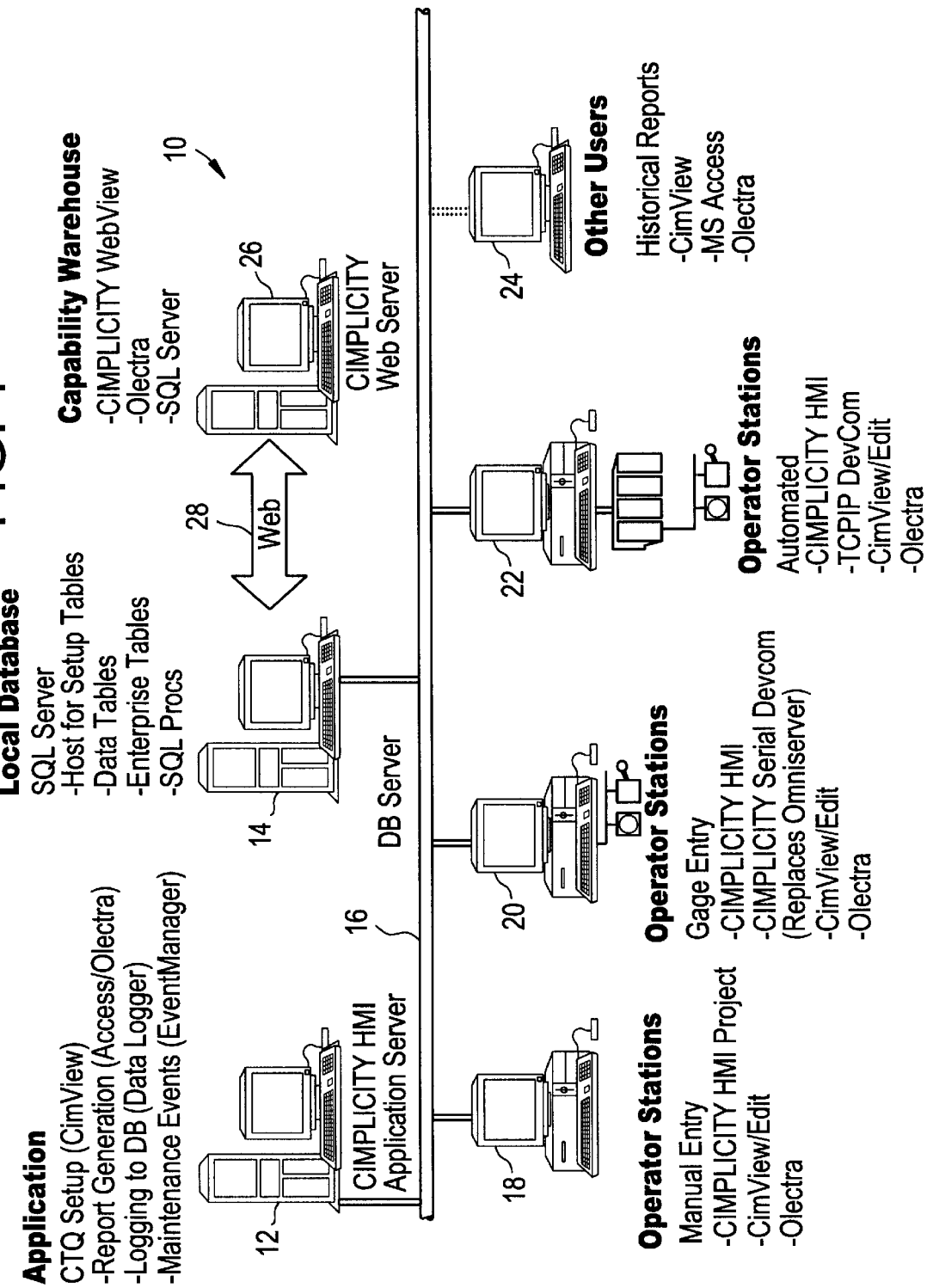
FIG. 1 shows a diagrammatic representation of a QMS architecture of the present invention.

With that overview in mind, turning now to FIG. 1, a sample QMS architecture 10 is shown integrated with the CIMPLICITY automation software by GE Fanuc. It is, however, within the scope of this invention to utilize the QMS described in the present application with other types of automation software as deemed appropriate.

The architecture 10 is shown to include an HMI (human machine interface) application server 12. The application server 12 preferably runs programs for CTQ setup, report generation, logging to the database, and maintenance events. For a CIMPLICITY based QMS application, the CTQ setup may run in CimView, the runtime viewer of CIMPLICITY HMI where process information is displayed in both text and graphic formats using alarms, video clips, pop-up windows and animation features. For the report generation program, Microsoft's Access query and reporting tool or Olectra may be used. The program to log to the database may be DataLogger which is the CIMPLICITY based database logger which uses the standard ODBC interface to log data, such as alarms, events and point values, to Microsoft Access Database files, Microsoft SQL server database or an Oracle database. EventManager by GE's Cimplicity HMI may be used for the maintenance events program.

A database server 14 in the architecture 10 is a local database which preferably is an SQL (Structured Query Language) Server because of its ability to perform complex data operations with a few simple commands. The server is a host for setup tables and stores data tables, enterprise tables and SQL procedures as well. The database server 14 and the application server 12 communicate over the network 16 which also connects servers 12 and 14 to the operator stations 18, 20, and 22, and other users 24, as will be discussed further below. The network 16 may be any one or combination of industry standard ModBus RTU, Ethernet, ModBus TCP/IP, MMS/JUCA2 types of networking protocols.

The database server 14 can also communicate with a web server 26, such as a CIMPLICITY web server, via web connection 28, which includes telephone or cable connections as is known in the industry. The web server 26 stores the capability warehouse including CIMPLICITY WebView, an easy way to transmit CIMPLICITY screens to a WebView user from the CIMPLICITY server directly into the Internet browser, Olectra charts, and an SQL server as previously described.

Operator Station 18 may be dedicated to manual entry operations including, but not limited to, CIMPLICITY HMI projects, CimView/Edit operations, and Olectra. Operator Station 20 may be dedicated to gage entry operations via CIMPLICITY HMI, CIMPLICITY Serial DevCom, CimView/Edit, and Olectra. Operator Station 22 may be dedicated to automated entry operations via CIMPLICITY HMI, TCPIP DevCom, CimView/Edit, and Olectra. Other users 24 may include historical report information generated from CimView, MS Access, and Olectra. Operator Stations 18, 20, and 22 and other users 24 are essentially "viewers" within the architecture 10 because they allow users to view and interact with the data distributed by the servers 12, 14, and 26.

Figure 2:
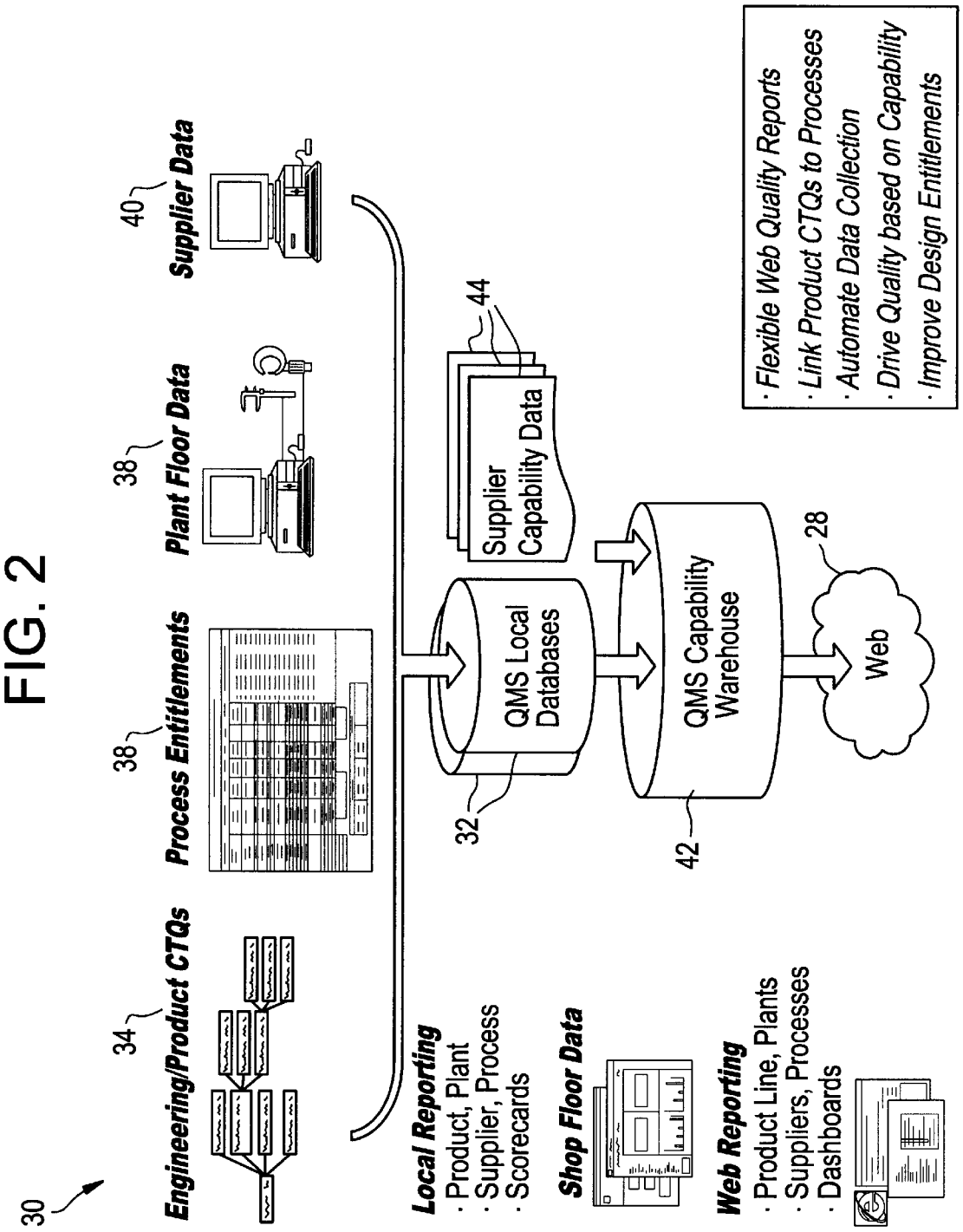
FIG. 2 shows a diagrammatic representation of data flow within the QMS of the present invention.

The data flow 30 in the QMS architecture 10 is shown in FIG. 2. The QMS database server 14 housing the local databases 32 (there may be one or more local databases 32) receives and stores engineering/product CTQs 34, process entitlements 36, plant floor data 38, and supplier data 40. Local reporting includes information relating to a product and/or plant, a supplier, a process, and scorecards, as will be further described below. This data supply in the local databases 32 is furnished, alongside supplier capability data 44, to the QMS capability warehouse 42 located on the web server 26. The QMS capability warehouse 42 is then accessible via the web 28. Web reporting can then include information relating to a product line, plants, suppliers, processes, and dashboards, that is, a multiplicity of what is available via local reporting. Quality reports from the web can be flexible because of the amount and types of information available. Product CTQs 34 can be linked to processes 36 because of their entry into common databases 32. The data collection can be automated via operator station 22. Furthermore, quality management is enhanced because quality can be driven based on the capability of monitored control devices and design entitlements can be improved. Design entitlements are the tolerances for which designs can sufficiently operate within and be acceptable.

Figure 3:
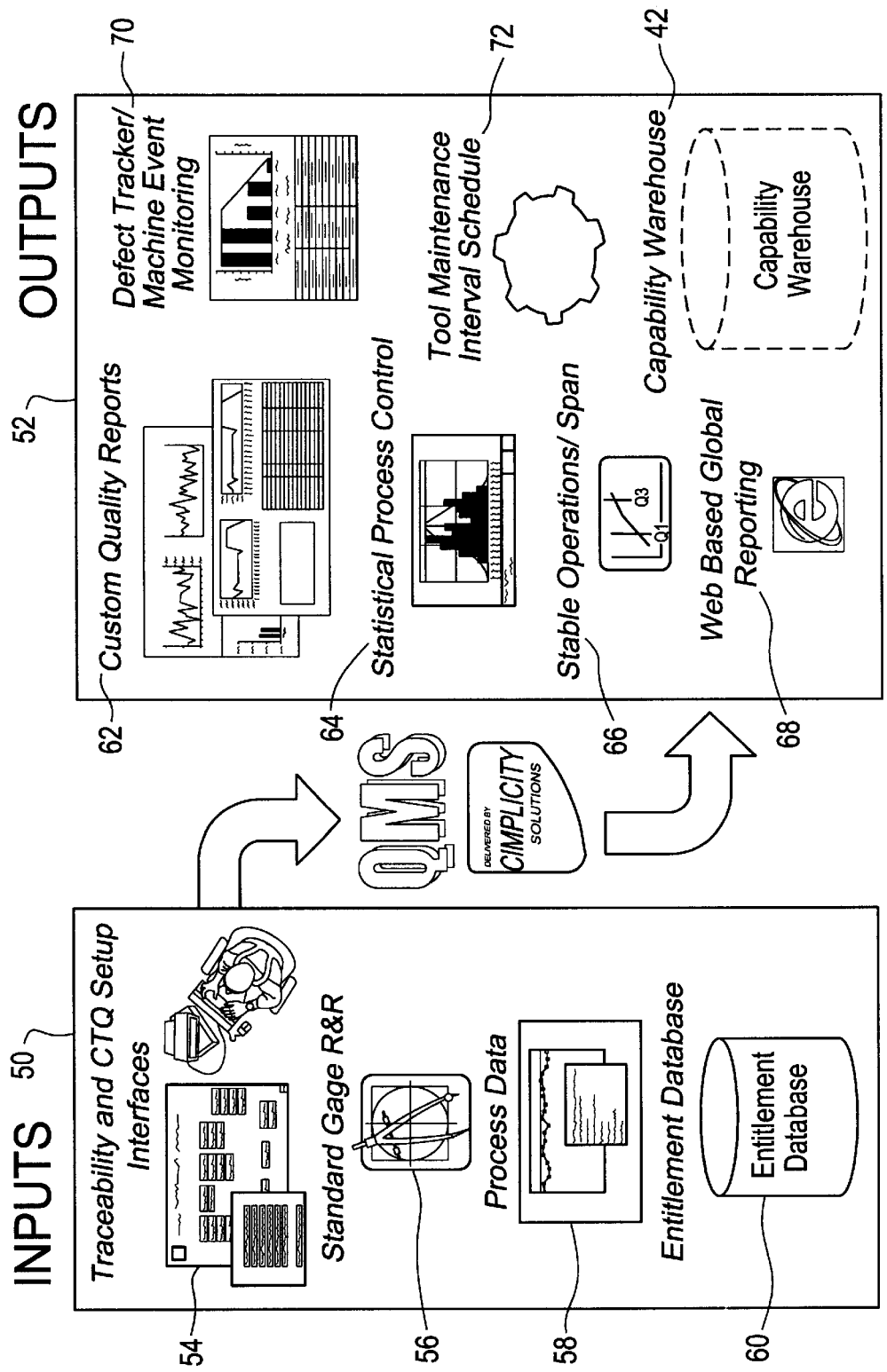
FIG. 3 shows a diagrammatic representation of the inputs and outputs of the QMS of the present invention.

Turning now to FIG. 3, a diagrammatic representation of the QMS system modules of the present invention is shown. Included as inputs 50, information and data provided either by the customer or the monitored equipment, are the traceability and CTQ setup interfaces 54, which includes engineering/product CTQs 34 which may be entered at operator station 18, standard gage R&R (repeatability and reproducibility—a measure of reliability of any measuring device used to gather data for CTQ's) 56, as provided by operator station 20, process data 58, as may be entered at operator station 22, and the entitlement database 60. The entitlement database 60 resides in the database server. Included as outputs 52, information available via the QMS of the present invention and provided either automatically or on demand, are custom quality reports 62, statistical process control ("SPC") 64, stable operations/span 66, web based global reporting 68, defect tracker/machine event monitoring 70, tool maintenance interval schedule 72, and the capability warehouse 74. The outputs 52 are available via the operator stations 18, 20, or 22, other users 24, or via the web 28.

Figure 4:
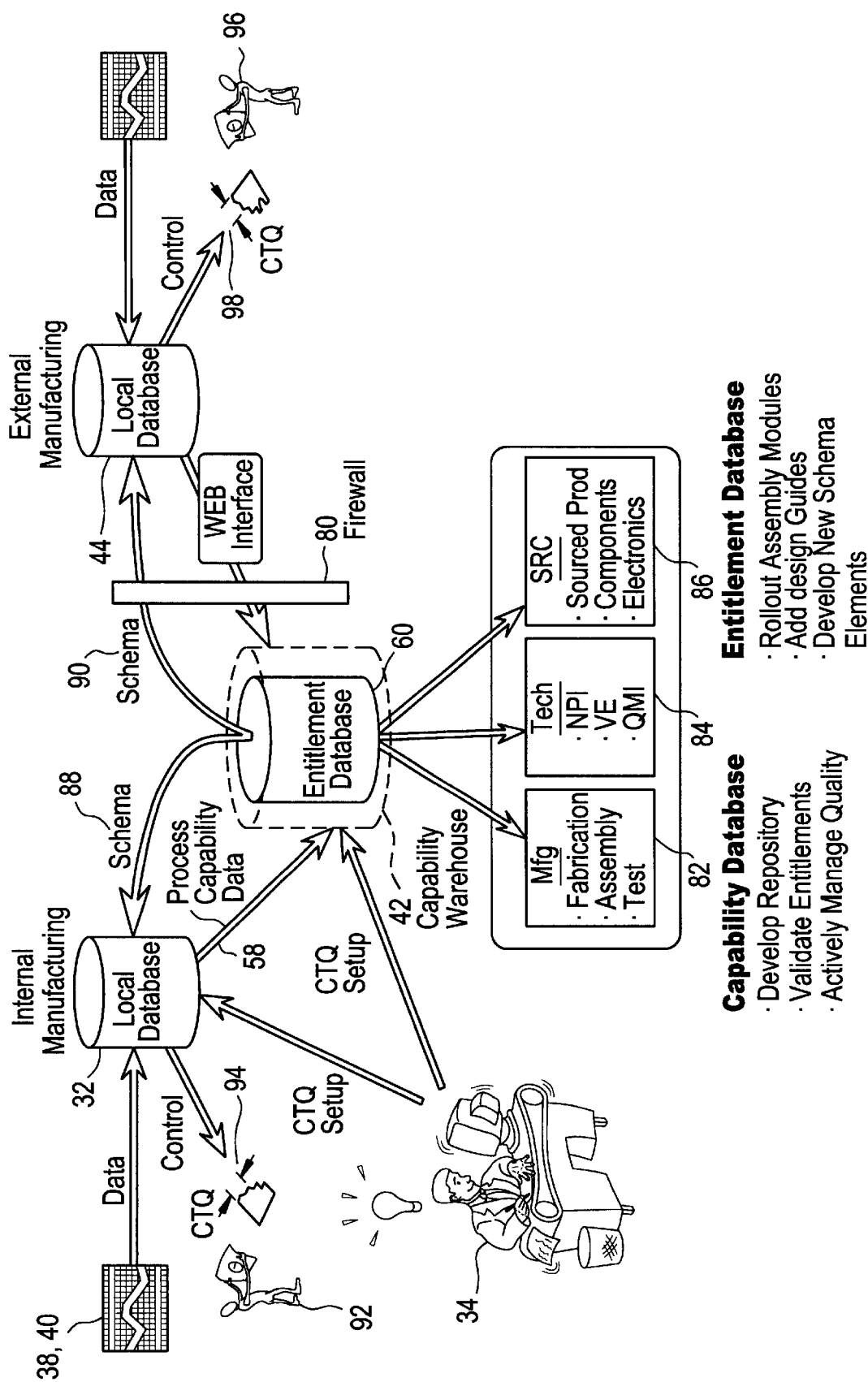
FIG. 4 shows a diagrammatic representation of the operational aspects of the QMS of the present invention.

At the center of the present invention, and as most clearly shown in FIG. 4, are the entitlement database 60 and the capability warehouse 42. The entitlement database 60, an input item 50, is embedded in the capability warehouse 42, an output item 52. The capability database 42 preferably will develop a repository, validate entitlements, and actively manage quality. The entitlement database 60 will preferably rollout assembly modules, add design guides, and develop new schema elements. The entitlement database includes expert tolerances by process schema established by industry standards and process experts. For General Electric, for example, tolerances are based on 4 or 6 Sigma and used by designers as the foundation for DFSS studies and assigning tolerances to prints. The capability warehouse is a universal database taking uploads from the SPC system and supplier process capabilities. Data will be used to compare actual capability with entitlements and various flexible quality reporting.

As explained earlier, the local database 32 for internal manufacturing receives data 38, 40 and CTQ information 34. The CTQ information 34 may also be sent directly to the capability warehouse 42. Process capability data 58 from the local database 32 is then transferred to the capability warehouse 42. On the external manufacturing side, the local database 44 containing supplier capability data as indicated in FIG. 2, is sent via a web interface to the capability warehouse 42. A firewall 80, functioning as a gateway or buffer between the intranet and the Internet, provides security to the wealth of information located in the capability warehouse 42. The entitlement database 60 within the capability warehouse 42 can provide information to the manufacturing ("Mfg.") 82 (e.g. fabrication, assembly, testing), technical ("Tech") 84 (e.g. NPI, VE, and QMI), and sourcing ("SRC") 86 (e.g. sourced products, components, and electronics) divisions of an industry. The entitlement database 60 can also provide the schema 88, 90 to the internal manufacturing local database 32 and external manufacturing local database 44, respectively. A schema describes the types of objects a directory may contain; it also describes the attributes, whether mandatory and/or optional, associated with an object type. The customers 92, 96 may obtain control CTQ information 94, 98, respectively, from the local databases 32, 44. Access to the local database 32 is achieved through the database server 14 through bus 16 shown in FIG. 1.

Figure 5:
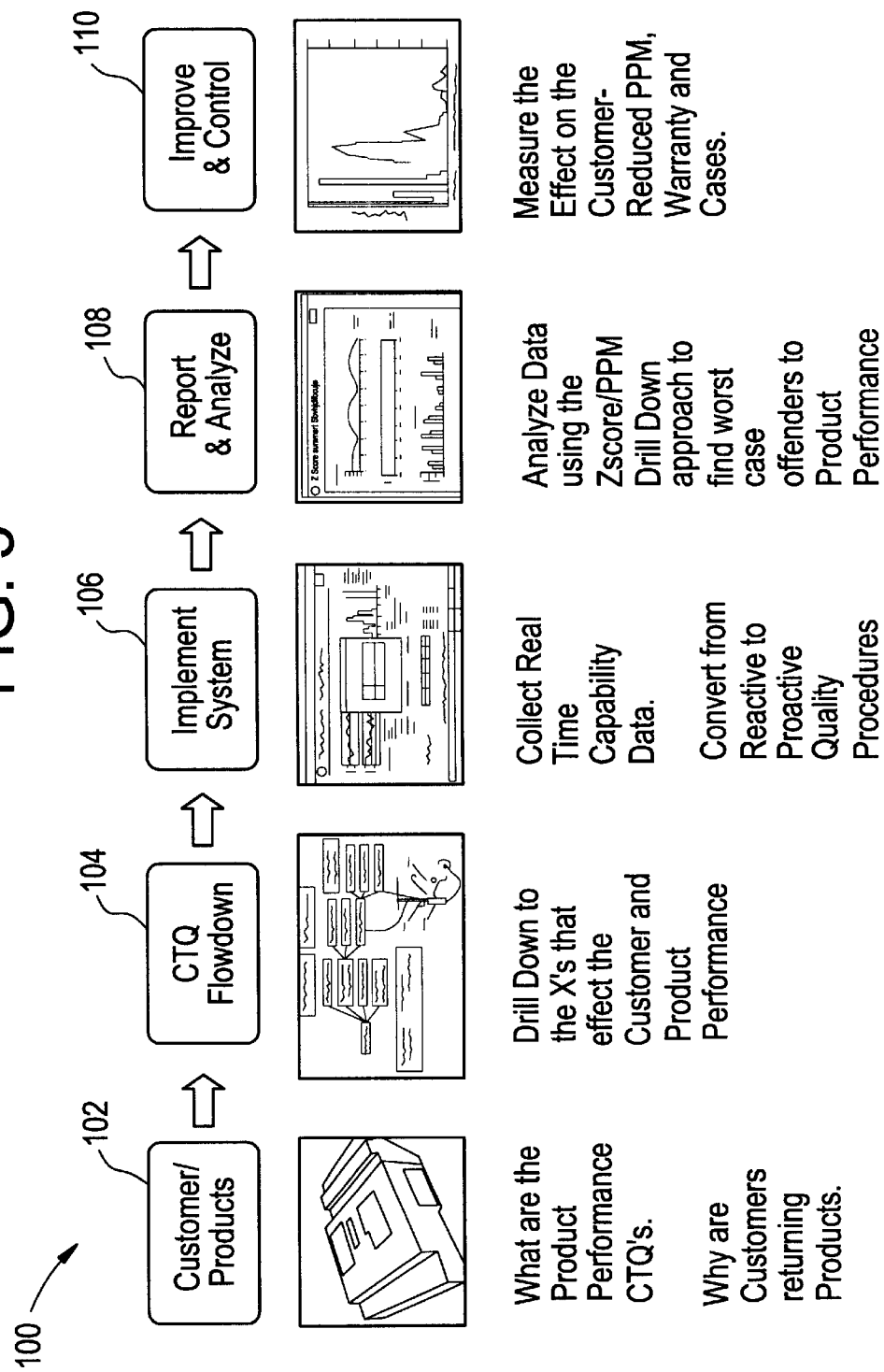
FIG. 5 shows a diagrammatic representation of a process under the QMS of the present invention.

The QMS process overview 100 is shown in FIG. 5. In box 102, information relating to the customer and/or products is entered into the system. Product performance CTQ's and information relating to why customers are returning products are exemplary statements which begin the QMS process. In box 104, a CTQ "flowdown" is charted to drill down to the root cause that effects the customer and product performance. For example, the flowdown may begin with Customer A. The system retrieves Customer A information including four CTQs: CTQ1, CTQ2, CTQ3, and CTQ4. Exemplary CTQs may include mechanical trip, no mechanical nuisance trip, continuity, and interruption capacity. If it is determined that CTQ2 is at issue, e.g. "no mechanical nuisance trip", then the factors which affect "no mechanical nuisance trip" are brought up, e.g. trip torque, shock withstand, and latch engagement. If it is determined that latch engagement is at issue, then the factors which affect latch engagement, e.g. $2^{nd}$ latch flatness, cradle radius, and primary latch, are brought up. Once the system has drilled down to low level CTQs using the CTQ flowdown, a visual showing the actual latch engagement factors, or other low level CTQs, may be brought up.

After the source of the problem is located in box 104, box 106 implements the system of collecting real time capability data. The QMS of the present invention is then converted from a reactive to a proactive quality procedural system. Box 108 exemplifies the reporting and analyzing feature of the QMS. Preferably, and as will be further discussed, the data is analyzed using a "Zscore"/PPM Drill Down approach to find the worst-case offenders to product performance. Box 110 represents the improvement and control phase of the QMS. The resultant effect on the customer is measured, which should most likely include reduced PPM (parts per million), warranty, and cases. PPM is used to calculate sigma measurements. Warranty is related to potential recall actions. Cases are open defect cases that may have a broader impact on produced parts shipped to customers.

FIGS. 6–9 show QMS sample MS access reports. The reports may be requested by the operator stations, other users, or the web users, and are preferably generated by the application server 12. While details of specific reports are shown, it should be understood that these reports are exemplary in nature, and other types of reports are within the scope of this invention.

Figure 6:
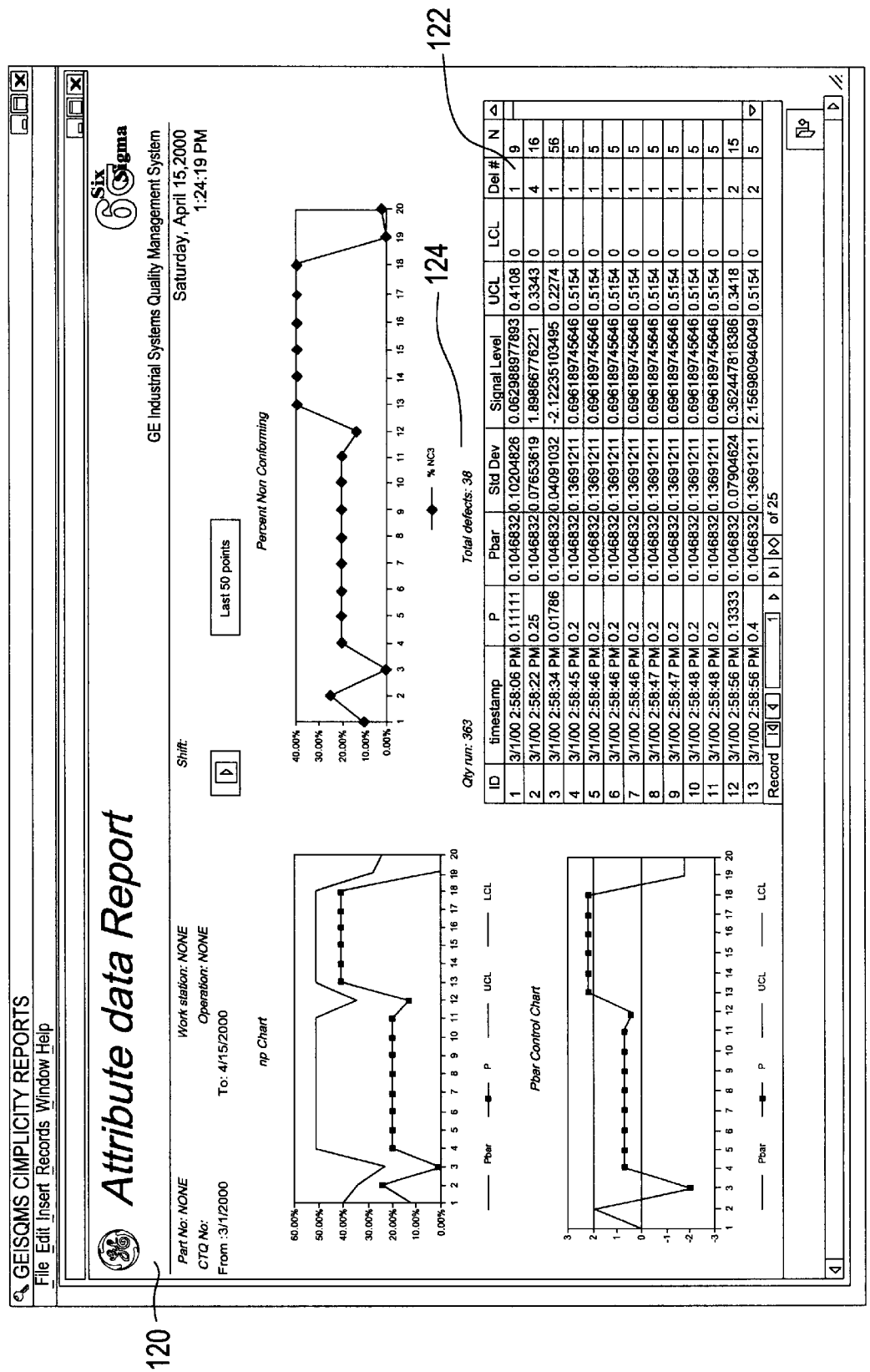
FIG. 6 shows a sample attribute data report generated by the QMS of the present invention.

FIG. 6 shows a sample "Attribute data Report" 120. The total number of defects per million is summed in column 122 and displayed at location 124.

Figure 7:
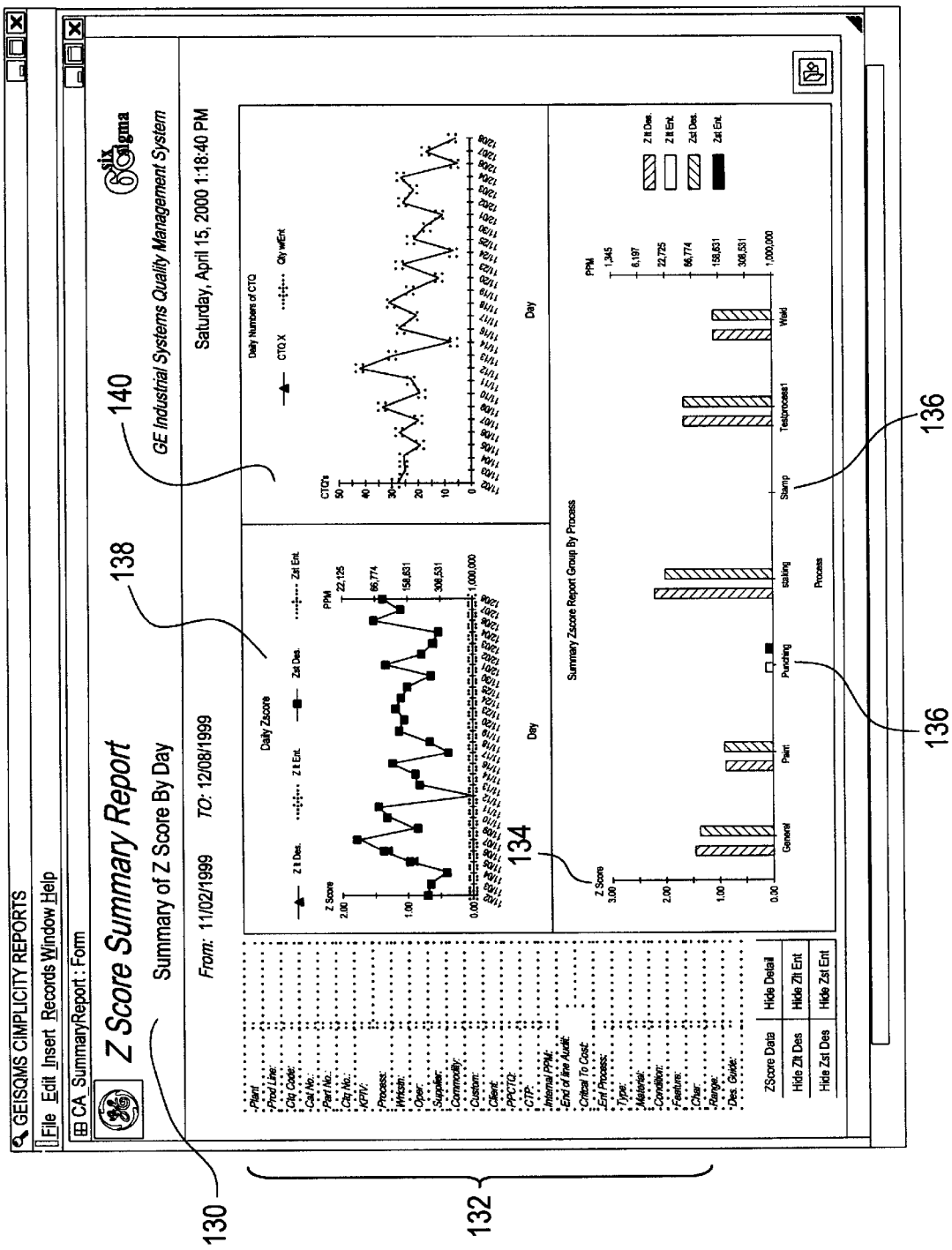
FIG. 7 shows a sample detailed defect report generated by the QMS of the present invention.

FIG. 7 shows a sample "Z Score Summary Report" 130. The CTQ dimensions are tagged with key information 132 such as product line, operator, part number, etc. A "Z Score" 134 maybe calculated as followed:

Calculating Z
1 Xnom=Nominal Dimension from CTQ Setup, USL/LSL=Upper/Lower Tolerance Limit,
2 Xbbar=X double bar, s=Std Deviation
3 Xu=Xnominal+USL, XI=Xnom-LSL
4 Xu or XI=Xbar+/-Zs
5 Rearranging, Z=M in[(ABS(xu-xbar)/s),(ABS(XI-Xbar)/s)]

Calculating Z for a time period for Trend Reporting
1 When a report is requested for a time period (Jan-March)
2 Data must broken into segments (Days, Weeks, Months) Selected from drop down on Report Menu
3 Calculate s, Xbbar, Z for the Time Segments selected Average Z Values for Z values 1 to X
1 Calculate P(d)=1-Normsdist(Z) Z is for a time segment as above
2 Sum P(d) 1 to X
3 Divide SumP(d) by X
4 Calculate Zavgst=1.5+Normsinv(P(d))

The Z Score may be compared to the PPM for each process 136, such as painting, punching, staking, etc. The Zlt is the long term capability of a process while Zst represents the short term capability of a process. Alternatively, the Z Score can be provided on a summary daily basis as shown in chart 138. Also available on a daily summary is the daily numbers of CTQ as shown in chart 140.

Figure 8:
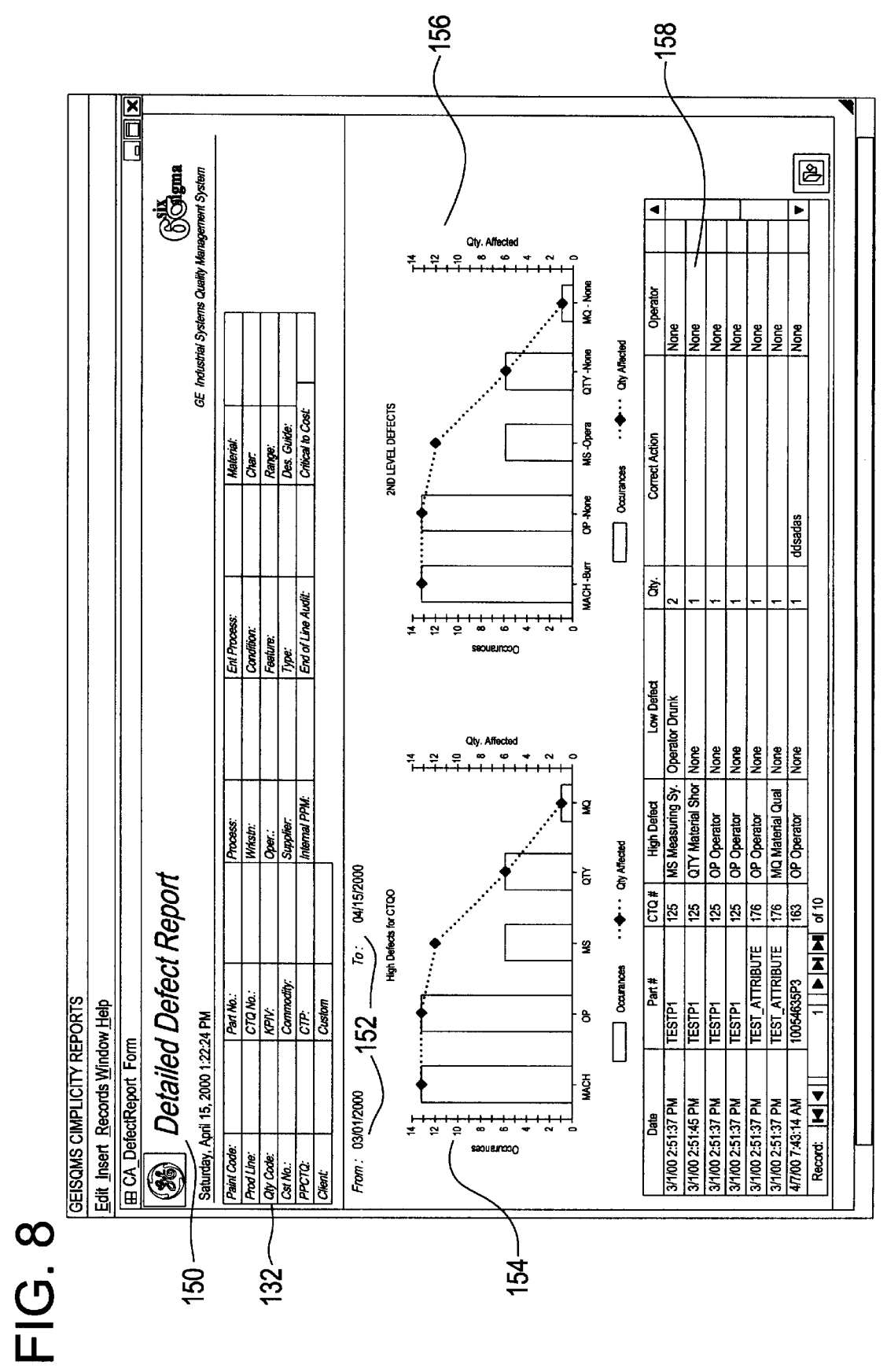

FIG. 8 shows a sample "Detailed Defect Report" 150. Again, the key information 132 may be displayed. For a selected time period 152, the occurrence of high and low level defects is charted versus the quantity affected in charts 154 and 156, respectively. Table 158 shows the details used to generate the charts 154, 156.

FIG. 9 shows a sample "Product Score Card Report" 160. Key information 132 may be displayed as shown. Four charts 162, 164, 166, and 168 are shown each addressing results for a different part. The average resultant Z Scores are plotted in chart 170 for each day in the requested time period 152.

Figure 10:
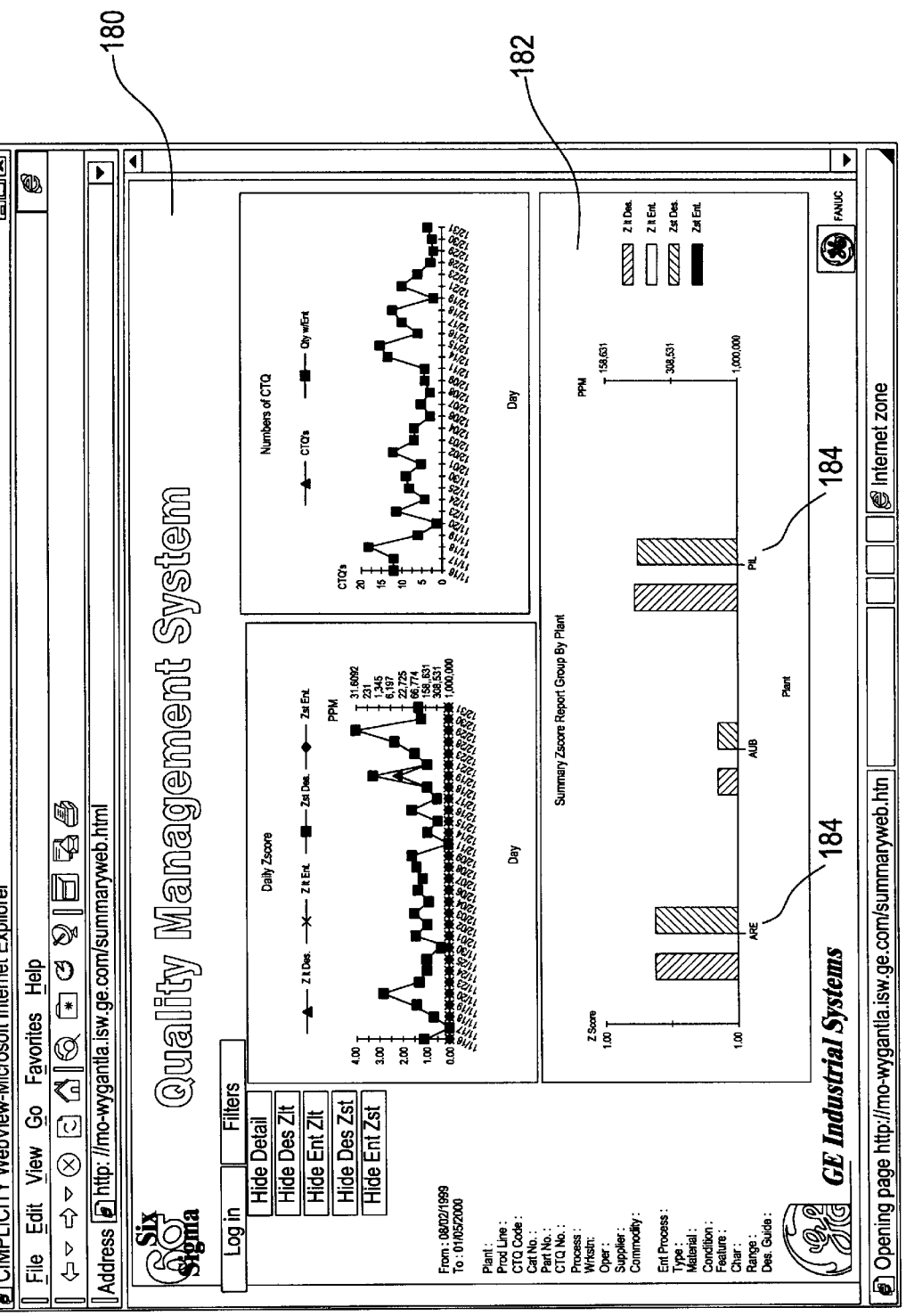

FIG. 10 shows a sample QMS web report 180. This report is accessible by a web user and may be similar to the Z Score Summary Report 130 shown in FIG. 7. Other reports, similar to those previously described, as well as other customer specific reports, may be requested by the web user. In report 180, the summary Z Score report as shown in chart 182 is grouped by plants 184, rather than by processes136 as shown in FIG. 7.

Thus, a QMS has been described which semi-automatically or automatically collects capability data which creates a closed loop system with design entitlements and real process capability validating design transfer functions. The system collects dimensional data semi-automatically or automatically from gages or test equipment on CTQ dimensions. These CTQ's are tagged with key information such as product line, machine, operator, product performance function which allows flexible reporting and filtering to extract desired data. The system will also analyze short vs. long term process capability through high level summary reporting with flexible reporting tools to drill down to root cause process issues and validate entitlements.

The QMS of the present invention is different from existing SPC (statistical process control) packages in that it is a pre-engineered solution, geared towards six sigma methods, which utilizes the entitlement database which allows a user to measure against multiple specification limits, rather than only one set of specification limits. Also, the QMS of the present invention allows a user to trace quality problems to a specific root cause using pre-configured filters and groupings, by using a relational database. The system further allows the warehouse of capability data from different plants and is client/server and web enabled, as opposed to SPC packages which are local node operation only. While the QMS of the present invention utilizes CIMPLICITY SPC as a data gathering tool, the reporting and the setup interface the QMS provides is completely independent of CIMPLICITY SPC.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A quality management system comprising:
   a first operator station loaded with a human machine interface software application, the first operator station adapted to receive manual entry operations;
   a second operator station adapted to receive data from gages, test equipment, control devices, and power monitoring devices;
   at least one gage or control device electrically connected to the second operator station;
   an application server storing a first program for setting up customer quality information, a second program for generating reports, a third program for logging to a database, and a fourth program for maintaining events;
   a database server storing a local database; and,
   a web server storing a capability warehouse,
   wherein the first operator station, second operator station, application server, and database server are connected over a shared network, and wherein the web server is connected to the database server over a web connection.

2. The quality management system of claim 1 wherein the database server stores critical to quality information, process entitlements, and plant floor data.

3. The quality management system of claim 2 wherein the critical to quality information is organized in flowdowns, each flowdown including a listing of critical to quality factors for a customer, each factor containing a subset of issues relevant to the factor, each issue containing a subset of features relevant to the issue.

4. The quality management system of claim 1 wherein a local database of an external source communicates with the capability warehouse over a web connection.

5. The quality management system of claim 1 further comprising a third operator station adapted to receive automated entry operations.

6. The quality management system of claim 5 further comprising a fourth operator station adapted to receive historical reports.

7. A computer based process for managing quality of electrical equipment gages and control devices, the process comprising:
   providing a network supporting operator stations and servers;
   manually inputting a selection of critical to quality factors into a first operator station;
   sending, over the network, the selection of critical to quality factors to an application server;
   configuring the critical to quality factors in the application server;
   storing configured critical to quality factors in a local database stored in a database server;
   connecting electrical equipment to be monitored on a quality basis to a second operator station;
   collecting data from the electrical equipment into the second operator station;
   storing the data from the electrical equipment in the local database;
   combining the data from the electrical equipment with the configured critical to quality factors to form process capability data;
   sending the process capability data from the database server to a capability warehouse in a web server;
   updating an entitlement database embedded in the capability warehouse;
   sending new schema information from the entitlement database to the local database; and,
   reporting information from the local database to the first operator station.

8. The process of claim 7 wherein the step of reporting information comprises generating a report in the application server.

9. The process of claim 8 further comprising requesting a report at the first operator station prior to the step of generating a report in the application server.

10. The process of claim 8 wherein the step of generating a report in the application server includes automatically generating the report based on pre-entered conditions.

11. The process of claim 7 wherein the step of configuring the critical to quality factors includes arranging the factors in a series of flowdowns, each flowdown including a listing of the critical to quality factors for a customer, each factor containing a subset of issues relevant to the factor, each issue containing a subset of features relevant to the issue.

12. The process of claim 11 wherein the step of sending new schema information includes updating the flowdowns.

13. The process of claim 7 wherein the local database is an internal manufacturing local database, the process further comprising sending supplier data to an external manufacturing local database, sending information from the external manufacturing local database to the capability warehouse over a web connection, updating the entitlement database based on the information received in the capability warehouse from the external manufacturing local database, sending new schema information from the entitlement database to the external manufacturing local database, and reporting information to an operator station controlled by an external manufacturer.

14. The process of claim 13 further comprising setting up a firewall between the external manufacturing local database and the capability warehouse.

15. The process of claim 7 wherein the step of reporting comprises analyzing a number of defects found in the data from the electrical equipment.

16. The process of claim 15 wherein the step of reporting comprises calculating a score based on the number of defects and the critical to quality factors affected by the defects.

17. The process of claim 7 wherein the step of configuring the critical to quality factors in the application server comprises tagging the critical to quality factors with equipment related information.

18. The quality management system of claim 1 wherein information from the at least one gage or control device is compared to critical to quality information stored in the local database.

19. A quality management system comprising:

a first operator station adapted to receive manual entry operations;

a second operator station adapted to receive data from gages, test equipment, control devices, and power monitoring devices;

at least one gage or control device electrically connected to the second operator station;

an application server storing a first program for setting up customer quality information, a second program for generating reports, a third program for logging to a database, and a fourth program for maintaining events;

a database server storing a local database including critical to quality information organized in flowdowns, each flowdown including a listing of critical to quality factors for a customer, each factor containing a subset of issues relevant to the factor, each issue containing a subset of features relevant to the issue; and, a web server storing a capability warehouse, wherein the first operator station, second operator station, application server, and database server are connected over a shared network, and wherein the web server is connected to the database server over a web connection.

20. The quality management system of claim 19 wherein the database server further stores process entitlements and plant floor data.

* * * * *